(12) United States Patent
Rhoads et al.

(10) Patent No.: US 8,799,961 B2
(45) Date of Patent: Aug. 5, 2014

(54) REMOTE CONTROL BASED INTERACTIVE PROGRAM GUIDE

(71) Applicant: Thomson Licensing, Issy de Moulineaux (FR)

(72) Inventors: Steven Charles Rhoads, Carmel, IN (US); Robert Andrew Rhodes, Carmel, IN (US); Benjamin Thomas Vondersaar, Indianapolis, IN (US); Thomas Anthony Stahl, Indianapolis, IN (US); Darrel Wayne Randall, Danville, IN (US); Douglas Paul Strachota, Indianapolis, IN (US); Thanabalan Thavittupitchai Paul, Carmel, IN (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/951,538

(22) Filed: Jul. 26, 2013

(65) Prior Publication Data

US 2014/0040953 A1 Feb. 6, 2014

Related U.S. Application Data

(60) Provisional application No. 61/678,269, filed on Aug. 1, 2012.

(51) Int. Cl.
*H04N 5/445* (2011.01)

(52) U.S. Cl.
USPC .................................. 725/54; 725/41; 725/56

(58) Field of Classification Search
USPC .......................................... 725/39, 41, 54, 56
See application file for complete search history.

(56) References Cited

U.S. PATENT DOCUMENTS 7,590,994 B2 * 9/2009 Fries ................................ 725/50
2011/0321095 A1 * 12/2011 Yao et al. ......................... 725/41

* cited by examiner

*Primary Examiner* — Jason J Chung
*Assistant Examiner* — Sumaiya A Chowdhury
(74) *Attorney, Agent, or Firm* — Robert D. Shedd; Jeffrey M. Navon

(57) ABSTRACT

The present invention relates to electronic program guides. Program guide state information is stored in a remote control which generates and delivers a pseudo-interactive guide to end users with the system state information (guide information to channel mapping maintained in the remote control device.

2 Claims, 2 Drawing Sheets

| Guide Channel | MPEG Stills | Guide Channel | MPEG stills |
| --- | --- | --- | --- |
| 50-1 | Video 10 Info | 51-1 | Video 19 Info |
| 50-2 | Video 11 Info | 51-2 | Video 20 Info |
| 50-3 | Video 12 Info | 51-3 | Video 21 Info |
| 50-4 | Video 13 Info | 51-4 | Video 22 Info |
| 50-5 | Video 14 Info | 51-5 | Video 23 Info |
| 50-6 | Video 15 Info | 51-6 | Video 24 Info |
| 50-7 | Video 16 Info | 51-7 | Video 25 Info |
| 50-8 | Video 17 Info | 51-8 | Video 26 Info |
| 50-9 | Video 18 Info | 51-9 | Video 27 Info |

230

240

| Guide Channel | MPEG Stills | Guide Channel | MPEG stills |
|---|---|---|---|
| 50-1 | Video 10 Info | 51-1 | Video 19 Info |
| 50-2 | Video 11 Info | 51-2 | Video 20 Info |
| 50-3 | Video 12 Info | 51-3 | Video 21 Info |
| 50-4 | Video 13 Info | 51-4 | Video 22 Info |
| 50-5 | Video 14 Info | 51-5 | Video 23 Info |
| 50-6 | Video 15 Info | 51-6 | Video 24 Info |
| 50-7 | Video 16 Info | 51-7 | Video 25 Info |
| 50-8 | Video 17 Info | 51-8 | Video 26 Info |
| 50-9 | Video 18 Info | 51-9 | Video 27 Info |

FIG. 2

REMOTE CONTROL BASED INTERACTIVE PROGRAM GUIDE

RELATED APPLICATIONS

This application claims the benefit of U.S. Provisional Patent Application No. 61/678,269, filed on Aug. 1, 2012 entitled Remote Control Based Interactive Program Guide, and is a continuation-in-part of Patent Cooperation Treaty Application PCT/US13/050805, filed on. Jul. 13, 2013 entitled Method and Apparatus For QAM Modulator Channel Distribution Having a Plurality of Modes the teachings of which are specifically incorporated herein by reference.

FIELD OF THE INVENTION

The present invention relates to program guides. More specifically, the present invention relates to program guides based in remote controls in order to provide users with pseudo-interactivity with the program guides.

BACKGROUND OF THE INVENTION

There are many environments where multiple video display devices, for example televisions (TV) exist, but only one, or just a few receivers, are in place to send channel information to the TVs. Sports bars are a prime example of such environment, but many others such examples are extant, especially when it is desired to send different channels or subchannels to different places in an environment, but to save cost, only a limited number of receivers are provided.

In the sports bar environment, for example, bartenders want to be able to control the content on each TV without having to use single or multiple TV remotes, since using a TV remote may cause adjacent TVs to also change channels. Using a remote in a sports bar thus now requires walking to each TV with a specific remote to change the channel, which may cause other nearby TVs to also change channels.

One such receiver, although there are many such receivers, which is often placed in a multiple TV environment such as a sports bar is the DirecTV® COM1000 content distribution system (designed and manufacture by TECHNICOLOR Inc., the owner of the present application and invention which is a TV receiver system capable of tuning and transcrypting up to 24 TV channels and which tunes and demodulates an MPEG-2 transport stream for further distribution in an environment through, for example, a QAM device or an internet protocol (IP) data distribution system, for example an IPTV system. The DirecTV® COM1000 is ideal for the multiple TV environment such as hotels, sports bars, and the like.

The DirecTV® COM1000 includes a QAM modulator card or board which receives the demodulated MPEG-2 transport stream for further distribution. The card is denoted a QAM24 modulator and it receives MPEG-2 transport packets from an Ethernet port and then QAM modulates the MPEG2 transport packets on one of twelve carrier frequencies. Each input stream results in one output QAM modulated channel (such as cable channel 50-1). However, nothing in the current content distribution systems allows individual receivers to play separate content on each TV without controlling the content with a separate remote for each TV.

Individual in-room receivers (television or receiver box) cannot generate a guide. The headend can generate a guide and send it out over the distribution network. Currently, the guide can be implemented as a scrolling display (non-interactive), broadcast over a single QAM channel. The user at the receiver end cannot interact with the guide or its motion.

It would be desirable to provide what appears to the user as an interactive guide without including a return communications channel. Such needs have not heretofore been fulfilled in the art.

SUMMARY OF THE INVENTION

The invention generates and delivers a pseudo-interactive guide to end users with the system state information (guide information to channel mapping) maintained in the remote control device. To solve the aforementioned long-felt needs and to solve the problems extant in the art, there are provided channel guides, remote controls and methods of creating a channel guide. Preferably, a bitmap is created for a program guide grid and at least one still image related to channel information of channels is encoded to be stored in the channel guide. The at least one still image is then transmitted as a channel which can be viewed on a display, wherein if more than one still image is encoded to create additional still images that have been encoded, transmitting the additional still images on different channels for viewing and storage in the channel guide. The channel guide is then stored in a remote control device.

The invention will be best understood by reading the following Detailed Description of Preferred Embodiments in conjunction with accompanying drawings which are first described briefly below.

BRIEF DESCRIPTION OF THE DRAWINGS

FIG. 2 is a block diagram showing the structure of a preferred program pseudo-interactivity provided in accordance with the present invention.

DETAILED DESCRIPTION OF PREFERRED EMBODIMENTS

Figure 1:
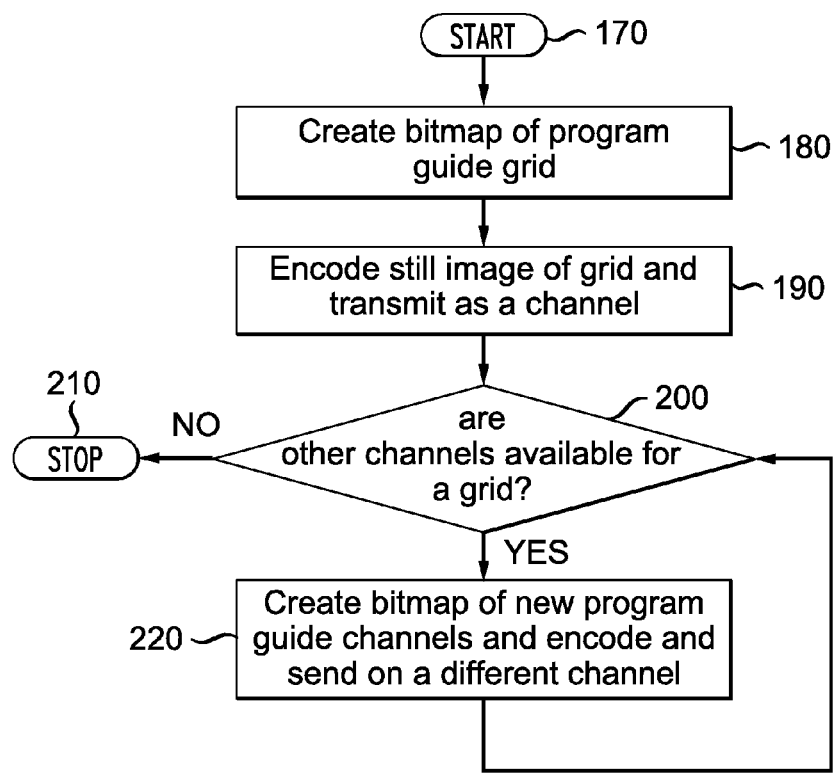
FIG. 1 is a flow chart of a preferred method for creating a program guide with pseudo-interactivity in accordance with the principles set forth herein.

In a preferred embodiment of the invention, a pseudo-interactive guide is generated shown schematically for example in FIG. 2, and delivered to end users with the system state information (guide information to channel mapping) maintained in the remote control device. Preferably, the following set of steps, or a subset of the following set of steps, is engaged in to achieve this result. Referring to FIG. 1, the flow chart of preferred methods for implementing these steps begins at 170.

At step 180, a modulator in a distribution system, for example the QAM24 modulator described in the Background, creates bitmaps of a program guide grid then, at step 190, MPEG-2 encodes the MPEG still image and transmits this as a channel that is viewable by the TV. Every few seconds the program guide grid scrolls up by one channel.

At step 200, it is determined whether other channels are available for the grid and if not, the method ends at step 210. If there are other channels available, then at step 220 the same or different modulator create a different MPEG still of only nine channels. Each different MPEG still will be broadcast on a different TV channel. The user can scroll up or down a page at a time by going up or down one TV channel.

For example on channel 50-3 might be an MPEG still shows the programming for channels 10-18. On channel 50-2 might be an MPEG still showing the programming for channels 19-27, and on channel 50-1 might be an MPEG still showing the programming for channels 28-36. Preferably, this can be implemented by having each modulator create a different MPEG still and broadcasting it on a different channel.

A different MPEG still (and thus a different TV channel) for each TV channel is broadcast. Each different MPEG still would have a single channel's grid guide entry highlighted. The list of channels could stay the same for nine different highlights (resulting in paging from the user's perspective) or each MEG still could have the highlight be at the top most entry (resulting in scrolling from the user's perspective).

For example, if there are channels 10-27, there would be 18 different channels devoted to providing MPEG stills. The MPEG stills could be on channels 50-1 through 50-9 and 51-1 through 51-9 and 52-1 through 52-9. This would cause a user experience where using the channel up or channel down would cause the program grid guide to go up or down one channel. There could also be an about text area that would show the programming information about the channel that is highlighted.

| Video channel | -> | Guide channel |
|---|---|---|
| 10 | | 50-1 |
| 11 | | 50-2 |
| 12 | | 50-3 |
| 13-2 | | 50-4 |
| 14 | | 50-5 |
| 15 | | 50-6 |
| 16 | | 50-7 |
| 17 | | 50-8 |
| 18 | | 50-9 |
| 19 | | 51-1 |
| 20 | | 51-2 |
| 21 | | 51-3 |
| 22-1 | | 51-4 |
| 23-3 | | 52-5 |
| ... | | |

As will be appreciated, there is a desire to permit the user to directly tune to a channel from the grid guide. For example, in the case above, if the user is watching channel 50-3 and the user presses the enter key or guide key then we would like to tune to channel 12.

There is also a desire when the guide button is pressed that the correct guide channel is selected. For example, if the user is watching channel 12 and the guide key is pressed, the TV should tune to channel 50-3.

In accordance with the invention, FIG. 2 is a depiction of a remote control which implements the above-described methods. Preferably, the remote knows which video channels are viewable by the user and which channels are MPEG still channels of the grid guide. Moreover, the remote knows the relationship between these channels. The remote would not ever send a channel up or channel down message since then the remote could not know if the TV received the message and it would then not know which TV channel the user is watching. Instead the remote would always send a full channel number to the TV so that the remote knows which TV channel the user is watching.

It will be appreciated by those with skill in the art that the hardware for implementing the principles taught herein can be accomplished on a tablet, a mobile phone, a laptop computer, a desktop computer and indeed any device which may be manipulated by a manager of an environment or user of the remote that contains multiple displays that will be serviced by the headend described herein. Such a device may have mechanical buttons, soft buttons and displays 230 which allow the manipulation of channel information and guide information to tune the individual displays to the individual channels as needed.

Moreover, such devices will contain the requisite memory to store the MPEG stills in a grid-like format in the remote control so that the remote control itself will contain the channel guide in a pseudo-interactive manner. Pseudo-interactivity as used herein means that the user can interact with the guide at least in a limited manner to allow the guide to tune the displays to the required video channels. As will be appreciated, as remote control devices and headend hardware become more sophisticated in the future, channel guides created in accordance with the present principles will provide fuller interactivity options, and indeed may become as fully interactive as is possible and necessary for future uses. As can be seen, the user may scroll the guide channels using buttons 230, in this case up and down buttons but other embodiments that allow navigation are possible, so that eventually all of the guide channels and video channel information in the MPEG stills are viewed, as shown at 240.

If the user is watching the third video channel (channel 12) and presses the guide key, the remote would take the user to the third MPEG still channel (50-3).

If the user presses the channel down key this means that the user really wants to scroll down one channel. This would cause the remote to tune to MPEG still channel 50-4 which will show channel 13 being highlighted.

If the user then presses the entry key or the guide key then the remote will cause the TV to tune to the highlighted TV channel which in this case is channel 13.

All of this requires that the remote contain a list of TV channels as shown and the corresponding MPEG-still guide channels as is also shown in FIG. 2. The remote therefore needs persistent (flash) memory that is easily updateable. The update method could a bi-directional IR or an RE path such as RF4CE.

The remote of FIG. 2 could also have predefined table modes where the remote could be told the following parameters after entering a program mode:
Base_video_channel: 10
Number of video channels per QAM carrier: 2
Base_guide_channel: 90
Number of guide channels per QAM carrier: 6
Total number of video channels: 18
This would create the following table:

| Video | -> | Guide |
|---|---|---|
| 10-1 | | 90-1 |
| 10-2 | | 90-2 |
| 11-1 | | 90-2 |
| 11-2 | | 90-4 |
| 12-1 | | 90-5 |
| 12-2 | | 90-6 |
| 13-1 | | 91-1 |
| 13-2 | | 91-2 |
| 14-1 | | 91-3 |
| 14-2 | | 91-4 |
| 15-1 | | 91-5 |
| 15-2 | | 91-6 |
| 16-1 | | 92-1 |
| 16-2 | | 92-2 |
| 17-1 | | 92-3 |
| 17-2 | | 92-4 |
| 18-1 | | 92-5 |
| 18-2 | | 92-6 |

One of the important features and advantages of the present invention involves the encapsulation of guide navigation and where in the system state information regarding what the viewer is actually seeing during guide navigation is kept. In current implementations this information is usually kept in a STB, the TV set itself, or in the headend, or cloud through a service provided by LodgeNet or other providers. In accordance with this invention, the guide state information is kept in the remote. This has not heretofore been achieved or performed in the art and evinces a significant advantage over prior solutions, as well as the solution to the problem of guide navigation.

There have thus been described certain preferred embodiments of content distribution systems in accordance with the present invention. While preferred embodiments have been described and disclosed in will appreciated by those with skill in the art that modification are within the true spirit and scope of the invention.

The invention claimed is:

1. A method of creating a channel guide, comprising the steps of:
   creating a bitmap of a program guide grid and MPEG encoding at least one still image related to channel information of channels to be stored in the channel guide with a single MPEG encoding and storing the encoded still image in a channel reference in the program guide grid;
   transmitting the at least one still image as a channel which can be viewed on a display, wherein if more than one still image is MPEG encoded to create additional still images that have been encoded, transmitting the additional still images on each different channels for viewing and storage in the channel guide;
   MPEG encoding the additional still images in additional encodings and storing the additionally encoded still images in separate channels in the program guide grid;
   sending to the remote control device a set of table modes which allow the channel guide stored in the remote to be stored according to a plurality of modes that allow different grids to be rendered which would be viewable;
   updating the remote control; and
   storing the channel guide in a remote control device.

2. The method recited in claim 1, wherein the MPEG encoding step is an MPEG-2 encoding step.

* * * * *